Patented July 14, 1925.

1,546,211

UNITED STATES PATENT OFFICE.

CAMILLE DREYFUS, OF BASEL, SWITZERLAND, ASSIGNOR TO THE AMERICAN CELLULOSE & CHEMICAL MANUFACTURING COMPANY, LTD., OF NEW YORK, N. Y., A CORPORATION OF DELAWARE.

MANUFACTURE OF PRODUCTS CONTAINING CELLULOSE.

No Drawing.   Application filed February 1, 1922. Serial No. 533,234.

*To all whom it may concern:*

Be it known that I, CAMILLE DREYFUS, a citizen of Switzerland, residing at Basel, Switzerland, have invented a certain new and useful Improvement in the Manufacture of Products Containing Cellulose, of which the following is a specification.

This invention relates to a process of treating cellulose or cellulose transformation products and materials or articles made therewith, all of which are hereinafter included in the term "cellulosic materials and articles" for the purpose of imparting new or improved properties thereto.

This invention may be applied for the treatment of cellulose or cellulose transformation products or any articles made therewith, as for instance cotton, cotton fabrics, cotton yarn, cotton paper, filter paper used for chemical purposes, and any other articles made with cellulose or cellulose transformation products.

According to the invention the cellulosic materials or articles are subjected to treatment with a substantially concentrated mixture of sulfuric acid and one or more aliphatic acids such as acetic, formic, propionic, or oxalic acid, at temperatures not substantially above ordinary room temperatures and removing the acid mixture by washing or otherwise.

Water or water-containing salts or substances may be present or employed in the mixture of acids, but only in relatively small amount, so that the acid mixture is substantially concentrated.

I have found for example, that when I treat cellulosic materials or articles such as referred to with a mixture of acetic acid and sulphuric acid, cellulosic products or articles are obtained having very remarkable and valuable qualities.

Example 1.

A cotton fabric for instance, is treated by immersion, impregnation or otherwise in the usual devices or other appropriate devices, for two minutes at ordinary temperature, with a mixture of equal parts by volume of concentrated sulphuric acid and ordinary glacial acetic acid. The cotton fabric is then separated from the acid mixture, washed with water, and if desired treated with very dilute ammonia solution in order to remove more quickly the last traces of acid. The material is then dried and, if desired, pressed or calendered.

The operation can be made on the material under tension or partially under tension if desired.

The resulting cotton fabric has very remarkable and valuable qualities; for instance, it appears as if it contained a permanent impregnation or finish.

Example 2.

Filter-paper made of cotton (such as is used for instance, for chemical purposes) is immersed or otherwise impregnated or treated during two minutes at an ordinary temperature by (or with) a mixture of equal parts in volume of concentrated sulphuric acid and acetic acid (this latter containing 15% of water and 85% acetic acid).

Then the paper is immersed in water and treated as in Example 1 to remove the acid mixture.

After drying, if desired, it can be pressed or calendered, and a paper is so obtained with very remarkable and valuable qualities; for instance, it appears as if it contained a permanent impregation or finish.

Paper to be used for osmose purposes can be manufactured for instance, according to this example.

The invention is not limited to the above examples, for example the composition of the acid mixture may be varied and the time of treatment, but the quantity of water, if water is present or employed in the acid mixture, will not substantially exceed the amount present or indicated in Example 2, and the temperature attained must not be substantially greater than ordinary room temperature. Instead of acetic acid, or partly instead of acetic acid, other appropriate aliphatic acid may be used, such for example as formic, proprionic or oxalic acids or mixtures of aliphatic acids can be used. Instead of cotton products or articles I may treat products or articles of wood cellulose or other cellulose or cellulose transformation products.

Water, when employed in the acid mixture may be incorporated therein in any convenient form, either as such or as water-containing substances such as salts containing water of crystallization or water-containing alcohol.

What I claim and desire to secure by Letters Patent is:

1. Process of treating cellulose materials and articles, comprising subjecting the same at not substantially above ordinary room temperature to the action of a mixture of concentrated sulphuric acid and of aliphatic acid not containing more than about 15% of water, and then removing the acid mixture.

2. Process of treating cellulose materials and articles, comprising subjecting the same at not substantially above room temperature to the action of a mixture of concentrated sulphuric acid and of acetic acid not containing more than about 15% of water, and then removing the acid mixture.

3. Process of treating cellulose materials and articles, comprising subjecting the same at not substantially above ordinary room temperature to the action of a mixture of concentrated sulphuric acid and glacial acetic acid, and then removing the acid mixture.

4. Process of treating cellulose materials and articles, comprising subjecting the same at about ordinary room temperature to the action of a mixture of about equal parts by volume of concentrated sulphuric acid and of acetic acid not containing more than about 15% of water for about two minutes, and then removing the acid mixture.

5. Process of treating cellulose materials and articles, comprising subjecting the same at about ordinary room temperature to the action of a mixture of about equal parts by volume of concentrated sulphuric acid and glacial acetic acid for about two minutes, and then removing the acid mixture.

6. Process of treating cellulose materials and articles, comprising subjecting the same at not substantially above ordinary room temperature to the action of a mixture of concentrated sulphuric acid and of a plurality of aliphatic acids not containing more than about 15% of water, and then removing the acid mixture.

In testimony whereof, I have hereunto subscribed my name.

CAMILLE DREYFUS.